United States Patent
Jang (10) Patent No.: US 9,042,564 B2
(45) Date of Patent: May 26, 2015

(54) WIRELESS COMMUNICATION DEVICE HAVING SPEECH RECOGNITION, SPEECH TRANSLATION, AND HEARING AID FUNCTIONS

(71) Applicant: Algor Korea Co., Ltd., Gwangju (KR)

(72) Inventor: Dong Soo Jang, Seoul (KR)

(73) Assignee: ALGOR KOREA CO., LTD., Gwangju (KR)

( * ) Notice: Subject to any disclaimer, the term of this patent is extended or adjusted under 35 U.S.C. 154(b) by 106 days.

(21) Appl. No.: 14/024,267

(22) Filed: Sep. 11, 2013

(65) Prior Publication Data

US 2014/0080407 A1   Mar. 20, 2014

(30) Foreign Application Priority Data

Sep. 18, 2012   (KR) .................. 10-2012-0103065

(51) Int. Cl.
| | |
|---|---|
| *H01R 29/00* | (2006.01) |
| *H04M 1/02* | (2006.01) |
| *G06F 17/28* | (2006.01) |
| *H04R 25/00* | (2006.01) |
| *G10L 15/00* | (2013.01) |
| *G10L 19/00* | (2013.01) |

(52) U.S. Cl.
CPC ............ *H04M 1/0202* (2013.01); *G10L 15/00* (2013.01); *G06F 17/289* (2013.01); *G10L 19/0018* (2013.01); *H04R 25/554* (2013.01)

(58) Field of Classification Search
USPC ............... 455/7–9, 11.1, 41.2, 41.3; 370/226, 370/293, 246, 274, 279, 315, 316, 492, 370/501; 380/23.1, 60, 312, 97; 379/52; 73/585
See application file for complete search history.

(56) References Cited

U.S. PATENT DOCUMENTS

| | | | | |
|---|---|---|---|---|
| 8,036,405 | B2 * | 10/2011 | Ludvigsen et al. | ........... 381/317 |
| 8,620,013 | B2 * | 12/2013 | Roeck | ............. 381/312 |
| 8,649,538 | B2 * | 2/2014 | Apfel et al. | .................. 381/314 |
| 8,712,083 | B2 * | 4/2014 | Solum | ............. 381/315 |
| 8,903,309 | B2 * | 12/2014 | Wells | ............. 455/41.1 |
| 2005/0135644 | A1 * | 6/2005 | Qi | ................. 381/314 |
| 2005/0153661 | A1 * | 7/2005 | Beck | ............... 455/73 |
| 2007/0082612 | A1 * | 4/2007 | Valve et al. | ................. 455/41.2 |
| 2007/0184805 | A1 * | 8/2007 | Zhu et al. | ...................... 455/306 |
| 2008/0013763 | A1 * | 1/2008 | Lotter et al. | ................. 381/315 |
| 2008/0024216 | A1 * | 1/2008 | Wang | ............. 330/251 |
| 2008/0165994 | A1 * | 7/2008 | Caren et al. | .................. 381/312 |
| 2009/0296967 | A1 * | 12/2009 | Mullenborn et al. | ......... 381/315 |

(Continued)

*Primary Examiner* — Dominic E Rego
(74) *Attorney, Agent, or Firm* — Kile Park Reed & Houtteman PLLC (57) ABSTRACT

Provided is a wireless communication device having speech recognition, speech translation, and hearing aid functions, which includes: an ITE (In-The-Ear) type radio transceiver including a microphone that receives an external voice, an ITE (In-The-Ear) type radio signal processor that processes radio data received from the microphone, a receiver that converts electrical signals from the radio signal processor into sound pressure, a volume controller that controls the intensity of the sound pressure, and a coil antenna for short-range wireless communications; and a portable radio repeater including a portable communication device that relays signals transmitted from the coil antenna of the ITE type radio transceiver, a coil antenna for short-range wireless communications with the ITE type radio transceiver, and a radio frequency (RF) antenna for two-way wireless communications with a portable radio repeater owned by another conversation partner.

4 Claims, 6 Drawing Sheets

(56) References Cited

U.S. PATENT DOCUMENTS

| | | | |
|---|---|---|---|
| 2009/0298431 A1* | 12/2009 | Rasmussen | 455/41.3 |
| 2010/0086152 A1* | 4/2010 | Rank et al. | 381/313 |
| 2010/0119100 A1* | 5/2010 | DeVine | 381/381 |
| 2012/0155563 A1* | 6/2012 | Munro et al. | 375/268 |
| 2012/0232856 A1* | 9/2012 | Bendtsen | 703/1 |
| 2012/0238856 A1* | 9/2012 | Kidmose et al. | 600/379 |
| 2013/0044907 A1* | 2/2013 | Klinghult | 381/312 |

* cited by examiner

WIRELESS COMMUNICATION DEVICE HAVING SPEECH RECOGNITION, SPEECH TRANSLATION, AND HEARING AID FUNCTIONS

TECHNICAL FIELD

The present invention relates to a wireless communication device having speech recognition, speech translation, and hearing aid functions, and more particularly to, a wireless communication device having speech recognition, speech translation, and hearing aid functions, which uses an ITE (In-The-Ear) type radio transceiver and a portable radio repeater, to thus enable two or more people to communicate multilateral dialogue even under the ambient noisy circumstances, and to also perform voice translation in real-time although the languages are different between conversation partners to thereby aid communications between the different linguistic conversation partners.

BACKGROUND ART

In general, in the case that ambient noise is severe in two or more multi-party conversations, the strength of speech of a speaker that is transferred to the listener's ears is reduced in inverse proportion to the square of the distance to reach the listener's ears. Thus, in the case ambient noise of the listener is still severe, it is difficult for the listener to hear the voice of the speaker. But, since the voice of the speaker reaches from the mouth to the ears, in the range of 20 cm or less, the speaker may hear his or her own voice clearly even if the ambient noise is great.

Thus, if the same principle as described above is applied to the listener and conversation partners are able to hear voice translation in real-time in two or more multi-party conversations, regardless of the languages spoken by the two or more conversation partners, the conversation partners may clearly recognize dialogues between them even under the severe noisy circumstances around each other.

The present inventor has noted that if a technology of an ear implantable, that is, an ITE (In-The-Ear) type radio transceiver, a technology of a repeater in which a central processor (CPU) is housed as in smart phones to thus process digital audio signals, a speech recognition technology, and a voice translation technology are integrated with each other, speakers and listeners such as persons with normal hearing, persons with hearing loss, and people who speak different languages, may converse with each other even in noisy surroundings without hindrance.

DISCLOSURE

Technical Problem

To solve the above problems, it is an object of the present invention to provide a wireless communication device having speech recognition, speech translation, and hearing aid functions, in which the voice of a speaker may be recognized by other conversation partners regardless of the ambient noise, even if the ambient noise is severe, in two or more multi-party conversations, with the same language or different languages, to thus reinforce speech discrimination.

Technical Solution

To accomplish the above object of the present invention, according to an aspect of the present invention, there is provided a wireless communication device having speech recognition, speech translation, and hearing aid functions, the wireless communication device comprising:

an ITE (In-The-Ear) type radio transceiver including a microphone that receives an external voice, an ITE (In-The-Ear) type radio signal processor that is attached to a person's ear, and that processes radio data received from the microphone, a receiver that converts electrical signals from the radio signal processor into sound pressure, a volume controller that controls the intensity of the sound pressure output from the radio signal processing unit, and a coil antenna for short-range wireless communications; and a portable radio repeater including a portable communication device that relays signals transmitted from the coil antenna of the ITE type radio transceiver, a coil antenna for short-range wireless communications with the ITE type radio transceiver, and a radio frequency (RF) antenna for two-way wireless communications with a portable radio repeater owned by another conversation partner.

According to another aspect of the present invention, there is provided a wireless communication method having speech recognition, speech translation, and hearing aid functions, the wireless communication method comprising the steps of:

wirelessly transmitting speaker's voice as a digital data signal via a radio-frequency (RF) antenna of a portable radio repeater of a speaker;

wirelessly receiving the digital data signal via a radio-frequency (RF) antenna of a portable radio repeater of a listener and then undergoing frequency-demodulation, to then undergo a digital signal processing procedure including decoding and speech synthesis and then undergo FM modulation;

wirelessly transmitting the FM modulated signal via a coil antenna built in the portable radio repeater of the listener;

receiving the FM modulated signal via a coil antenna built in an ITE (In-The-Ear) type radio transceiver or an ear-ring type radio transceiver that is worn by the listener, to then undergo FM demodulation and amplification and volume control in an appropriate intensity in a volume controller and a radio signal processor, and to then output sound pressure of the voice via a receiver to thereby enable the listener to hear the voice.

Advantageous Effects

As described above, the present invention provides an effect that individuals each wearing a radio transceiver and a radio repeater may listen a speaker's voice clearly with a listener's language, regardless of whether languages that are used in multi-party of two or more are same or not, and regardless of ambient noise, to thus enable the individuals to converse with each other even in the midst of noise.

In addition, since the radio transceiver converts the analog voice signal to the digital voice signal to transmit and receive the digital voice signal from and to the radio repeater, the time delay is not caused by the operation and sound feedback, that is, howling that occurs when a receiver's output sound is input back to the microphone is removed by the digital feedback eliminator built in the radio transceiver.

According to the present invention, the speech recognizer, the universal encoder, the universal decoder, and the speech synthesizer do not work at the same time, but since only the speech recognizer and the universal encoder work in the speech mode, and only the universal decoder and the speech synthesizer work in the listening mode, the time delay due to the digital signal processing is not big.

In addition, since the receiver operation is synchronized by the controller at the time between the speech mode and the listening mode, there is almost no likelihood of acoustic howling, and since the howling is secondarily removed by the digital feedback eliminator, clear voice may be heard even in loud noisy environments.

DESCRIPTION OF DRAWINGS

The above and other objects and advantages of the present invention will become more apparent by describing the preferred embodiment thereof in detail with reference to the accompanying drawings in which.

BEST MODE

Hereinbelow, a wireless communication device having speech recognition, speech translation, and hearing aid functions, according to an embodiment of the present invention will be described with reference to the accompanying drawings. The same or similar elements in the drawings are assigned with the same or similar reference numerals for convenient description.

Figure 1:
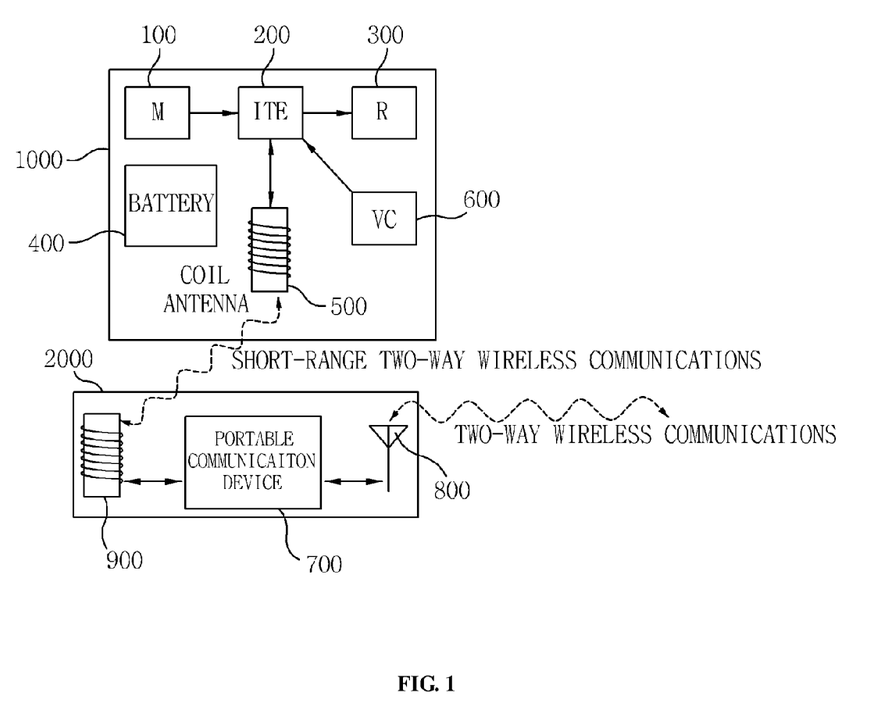
FIG. 1 is a block diagram showing a wireless communication device having speech recognition, speech translation, and hearing aid functions in accordance with an embodiment of the present invention.

FIG. 1 is a block diagram showing a wireless communication device having speech recognition, speech translation, and hearing aid functions in accordance with an embodiment of the present invention.

As shown in FIG. 1, the communication device of the present invention includes: an ITE (In-The-Ear) type radio transceiver 1000 including a microphone (M) 100 that receives an external voice from the outside of the communication device, an ITE (In-The-Ear) type radio signal processor 200 that is attached to a person's ear as an integrated circuit (IC) chip, and that processes radio data received from the microphone 100, a receiver (R) 300 that converts electrical signals from the radio signal processor 200 into sound pressure, a volume controller (VC) 600 that controls the intensity of the sound pressure output from the radio signal processor 200, and a coil antenna 500 for short-range wireless communications; and a portable radio repeater 2000 including a portable communication device 700 that relays voice signals transmitted from the coil antenna 600 of the ITE type radio transceiver 1000, a coil antenna 900 for short-range wireless communications with the ITE type radio transceiver 1000, and a radio frequency (RF) antenna for two-way wireless communications with another portable radio repeater (not shown).

In the above embodiment, individuals who converse with each other may wear the radio transceiver 1000 in the ear, and may hold the portable radio repeater 2000 in the pocket of clothe or handbag.

In other words, each individual who participates in the conversation may hold an identical radio transceiver 1000 and an identical radio repeater 2000, to thereby enable information received by the radio repeater 2000 to be transmitted to the radio transceiver 1000, and the voice signal that is signal processed in the radio transceiver 1000 to be heard by the individual.

The case where the radio transceiver 1000 is worn in the ear has been described in the above description, but the present invention is not limited thereto. For example, in the case of requiring hours of use to be long, the battery capacity may be as large as possible, to thus enable the radio transceiver 1000 to be formed into an ear-ring type. Of course, a secondary rechargeable battery may be used as the battery 400, in addition to a primary battery.

Figure 2:
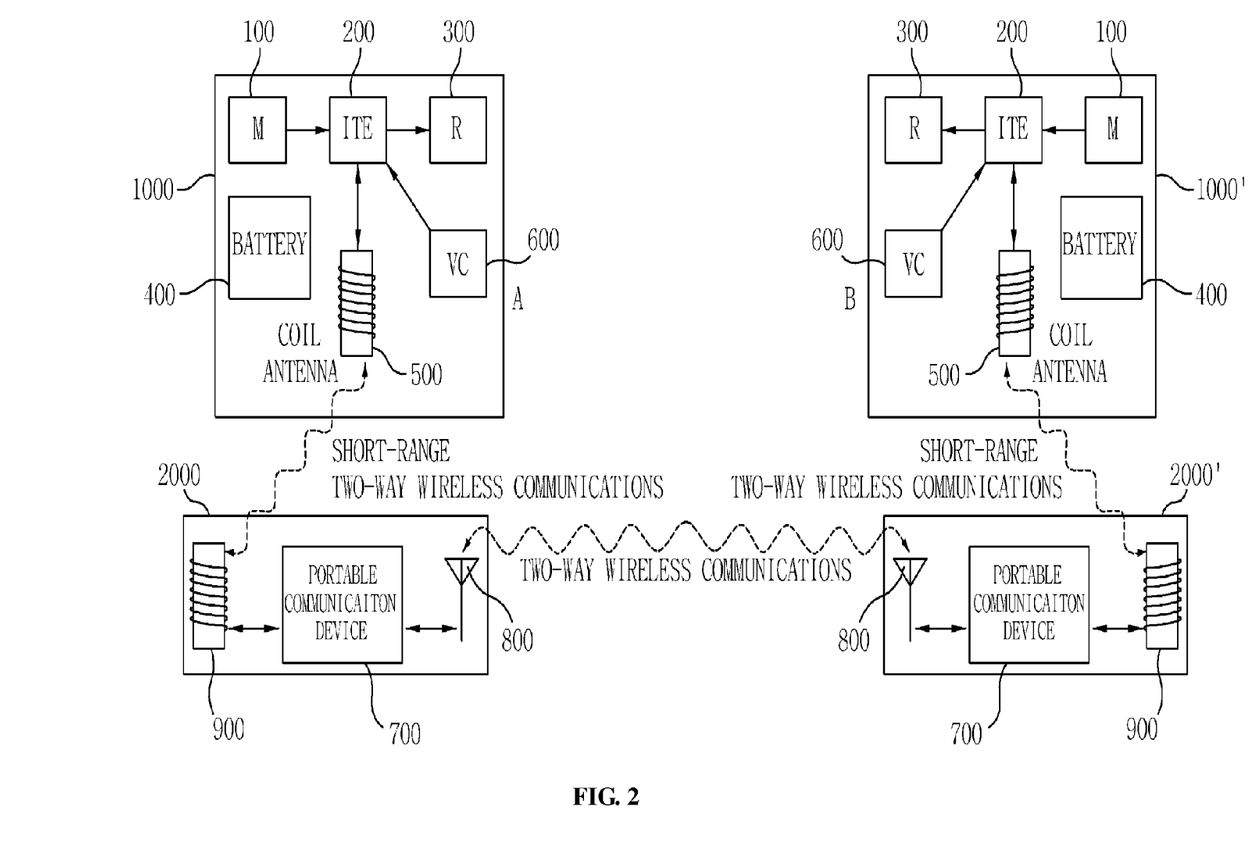
FIG. 2 is a block diagram for explaining a process of transmitting and receiving conversations between two persons A and B in which the two persons wear a wireless communication device in accordance with an embodiment of the present invention.

FIG. 2 is a block diagram for explaining a process of transmitting and receiving conversations between two persons A and B in which the two persons wear a wireless communication device in accordance with an embodiment of the present invention.

As can be seen from FIG. 2, since components of FIG. 2 are the same as those of FIG. 1, the detailed description thereof will be omitted, but only a process of transmitting and receiving conversations between two persons A and B will be described below. In other words, a process of performing wireless communications between the two persons A and B will be described.

First of all, a voice of a person A is converted to a digital signal through a microphone 100, and an ITE (In-The-Ear) type radio signal processor (ITE) 200 in an ITE type or ear-ring type radio transceiver 1000 that is worn by the person A, to then undergo FM (Frequency Modulation) processing to thus be wirelessly transmitted via a coil antenna 500 for short-range wireless communications. Then, the wirelessly transmitted FM processed signal is received via a coil antenna 900 of a radio repeater 2000 in which the coil antenna 900 has the same structure and function as those of the coil antenna 500, and then is FM-demodulated in a portable communication device 700 to then undergo a digital signal processing procedure including speech recognition and encoding and then undergo FM modulation again to thus be wirelessly transmitted via a RF antenna 800.

Then, the voice of the person A is wirelessly transmitted via the RF antenna 800 of the portable radio repeater 2000. The digital data signal that is wirelessly transmitted via the RF antenna 800 of the portable radio repeater 2000 is wirelessly received via a RF antenna 800 of a portable radio repeater 2000' of a person B, and then FM demodulated in a portable communication device 700 of the portable radio repeater 2000' of the person B, to then undergo a digital signal processing procedure including decoding and speech synthesis. Then, the digital data signal is FM modulated again and wirelessly transmitted via a coil antenna 900 built in the portable radio repeater 2000' of the person B, to then be received by a coil antenna 500 of an ITE (In-The-Ear) type or ear-ring type radio transceiver 1000' that is worn by the person B, and to then undergo FM demodulation and amplification and volume control in an appropriate intensity in a volume controller 600 and an ITE type radio signal processor (ITE) 200, and to then output sound pressure of the voice via a receiver 300 to thereby enable the person B to hear the voice of the person A. Even in the case that a voice of the person B is transferred to the person A, the above-mentioned voice transfer processing manner is applied likewise. The paths of the voice from the person A to the person B or from the person B to the person A are controlled to be synchronized by the ITE type radio signal processors (ITE) 200 of the radio transceivers 1000 and 1000' of the persons A and B, respectively. Thus, the voice is clearly communicated between the two persons A and B.

Figure 3:
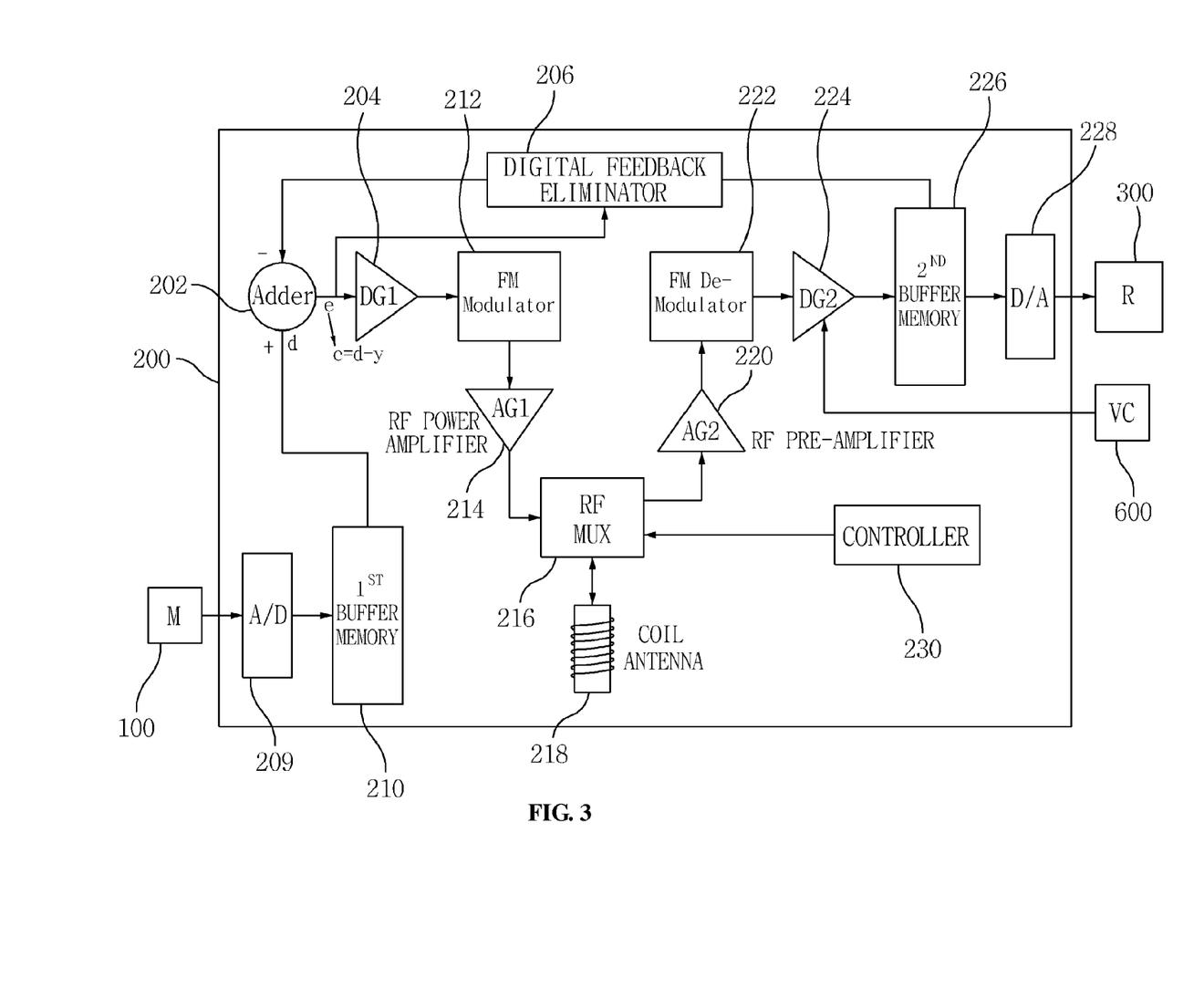
FIG. 3 is a block diagram showing details of an ITE (In-The-Ear) type radio signal processor of FIG. 2.

FIG. 3 is a block diagram showing details of an ITE (In-The-Ear) type radio signal processor (ITE) 200 of FIG. 2.

As shown in FIG. 3, the ITE (In-The-Ear) type radio signal processor (ITE) 200, includes: an analog-to-digital (A/D) converter 209 that converts an analog signal output from the microphone 100 into a digital signal; a first buffer memory 210 that temporarily stores the signals output from the A/D converter 209; a second buffer memory 226 that temporarily stores the signals to be output; and a digital-to-analog (D/A) converter 228 that converts a digital signal into an analog signal prior to being output to the receiver 300.

The radio signal processor 200 includes: a first digital amplifier (DG1) 204 that digital power amplifies the digital signal output from the first buffer memory 210; a FM (Frequency Modulation) modulator 212 that FM modulate the power amplified signal from the first digital amplifier (DG1) 204; a first analog power amplifier (AG1) 214 that minimizes noise included in the digital signal modulated in the FM modulator 212 to thus wirelessly amplify the noise-minimized digital signal; an analog signal switching device (RF MUX) 216 for switching the signal output from the first analog power amplifier 214; a coil antenna 218 that propagates the signal output from the analog signal switching device 216; and a controller 230 that controls the switching operation of the switching device 216 between a speech mode and a listening mode. In addition, the radio signal processor 200 includes: a vector adder 202 that vector sums the signal output from the first buffer memory 210 and the signal fed back from the buffer memory 226; a digital feedback eliminator 206 that prevent howling that occurs when the sound output from the receiver 300 is fed back to the microphone 100; a second analog pre-amplifier (AG2) 220 that minimizes communication noise from the RF signal switched by the analog signal switching device 216; a FM demodulator 222 that demodulates the signal amplified by the second analog pre-amplifier 220; and a second digital amplifier (DG2) 224 that amplifies the signal demodulated by the FM demodulator 222.

Hereinafter, the radio signal processor 200 that is configured as described above according to the present invention will be described.

A speaker's voice is input to the microphones 100 of the radio transceiver 1000 worn by the speaker, and then the voice signal is converted to a digital voice signal via the analog-to-digital converter 209, to then be temporarily stored in the first buffer memory 210, and then sequentially amplified and output via the first digital amplifier 204. Then, the digital data is modulated in the FM modulator 212 to then minimize communication noise to thereby power amplify the digital data via the first analog power amplifier 214. Thereafter, the power amplified digital data is output to the coil antenna 218 via the analog signal switching device 216 to then be output and transmitted for short-range communications.

In addition, the radio signal that is input to the coil antenna 218 for short-range communications, is input to the radio transceiver via the analog signal switching device 216 to then pre-amplify the radio signal by minimizing communication noise in the second analog pre-amplifier 220, and then demodulate the digital data in the FM demodulator 222. Then, the demodulated digital data is amplified in the second digital amplifier 224 to then be sequentially temporarily stored in the second buffer memory 226 and then convert the digital signal into the analog signal via the digital-to-analog converter 228. Thereafter, the analog signal is output as an analog signal sound via the receiver 300.

Here, those skilled in the art may clearly understand that a PDM (Pulse Density Modulation) processing unit may be used instead of the digital-to-analog converter 228. The second digital amplifier (DG2) 224 is controlled to control the output volume level by the volume controller (VC) 600 to thus enable the user to listen to the sound of easy listening level.

The digital feedback eliminator 216 removes howling that occurs when a voice output via the receiver 300 is fed back to the microphone 100 again, in a manner that the digital data calculated from the digital data just before being temporarily stored in and output from the second buffer memory 226 and the digital data that is input to the first digital amplifier 204 is subtracted from the digital data output from the first buffer memory 210 in the vector adder 202.

The vector adder 202 transmits a result that is obtained by subtracting the digital data y output from a third buffer memory 206a of the digital feedback eliminator 206 to be described later in connection with FIG. 4, sequentially from the digital data d output from the first buffer memory 210, that is e=d−y, to the first digital amplifier 204. If acoustic feedback, that is, howling occurs, the digital feedback eliminator 206 adaptively outputs the digital data y so that the result of e (=d−y) is minimized. Thus, the digital data e is applied to the digital feedback eliminator 206.

Figure 4:
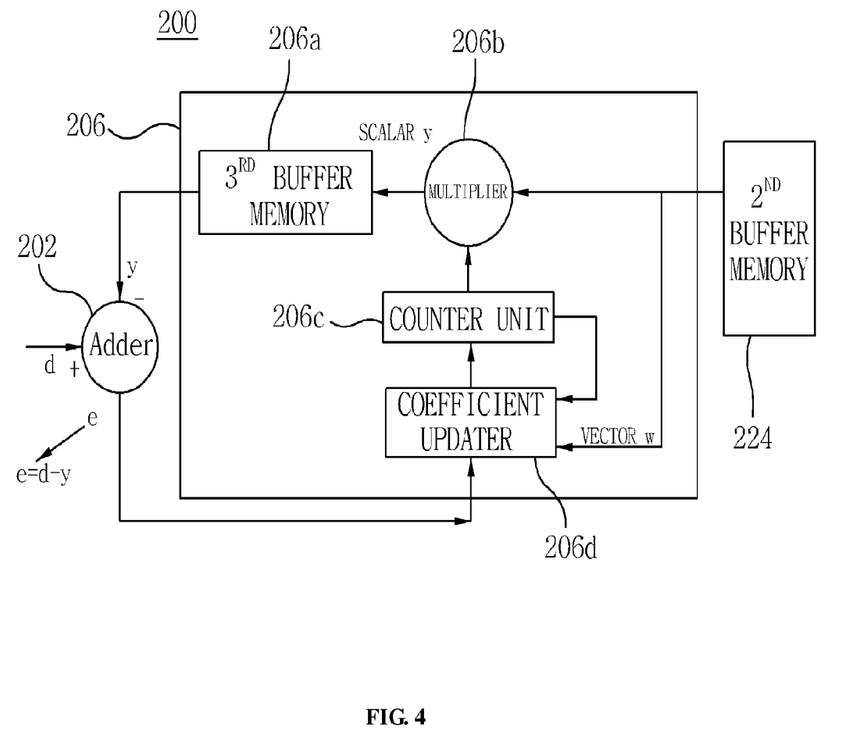
FIG. 4 is a block diagram showing details of a digital feedback eliminator of FIG. 3.

FIG. 4 is a block diagram showing details of a digital feedback eliminator of FIG. 3. The digital feedback eliminator 206 includes: a vector multiplication arithmetic unit 206b; a memory counter unit 206c that stores digital coefficient data by the number of vector w for vector multiplication with the second buffer memory 226; a third buffer memory 206a that sequentially stores a scalar digital value v that is a scalar value of a scalar y that is a result of a vector multiplication operation of the number w of pieces of the digital data of the second buffer memory 226 and the number w of pieces of the digital data of the memory counter unit 206c; and a coefficient updating unit 206d that adaptively updates the number w of the vectors of the memory counter unit 206c, from the number w of pieces of the digital data of the second buffer memory 226, the number w of pieces of the digital data of the memory counter unit 206c, and the number w of pieces of the digital data input to the digital feedback eliminator 206.

Assuming that the number of pieces of data output from the vector adder 202 built in the radio transceiver 1000 of FIG. 1 is the number w, the data is an input data vector of the digital feedback eliminator 206. In addition, assuming that the number of pieces of digital data of the second buffer memory 226 is the number w equally, the data is also an input data vector of the digital feedback eliminator 206. The memory counter unit 206c of the digital feedback eliminator 206 is sequentially operated with respect to the total number w of pieces of data, in a manner that the digital data of the second buffer memory 226 is multiplied with the digital data output from the vector adder 202, and then the multiplication result is added to the data of the memory counter unit 206c, to then adaptively restore the addition result in the memory counter unit 206c. The number w of coefficient vectors stored in the memory counter unit 206c are operated with vector multiplication with the number w of pieces of data of the second buffer memory 226, to thus calculate a scalar value y and to then sequentially store the scalar value in the third buffer memory 206a. While these operations are repeated by the number w of times, the coefficient data is adaptively updated the number w of times by operation of the coefficient updating unit 206*d*.

Figure 5:
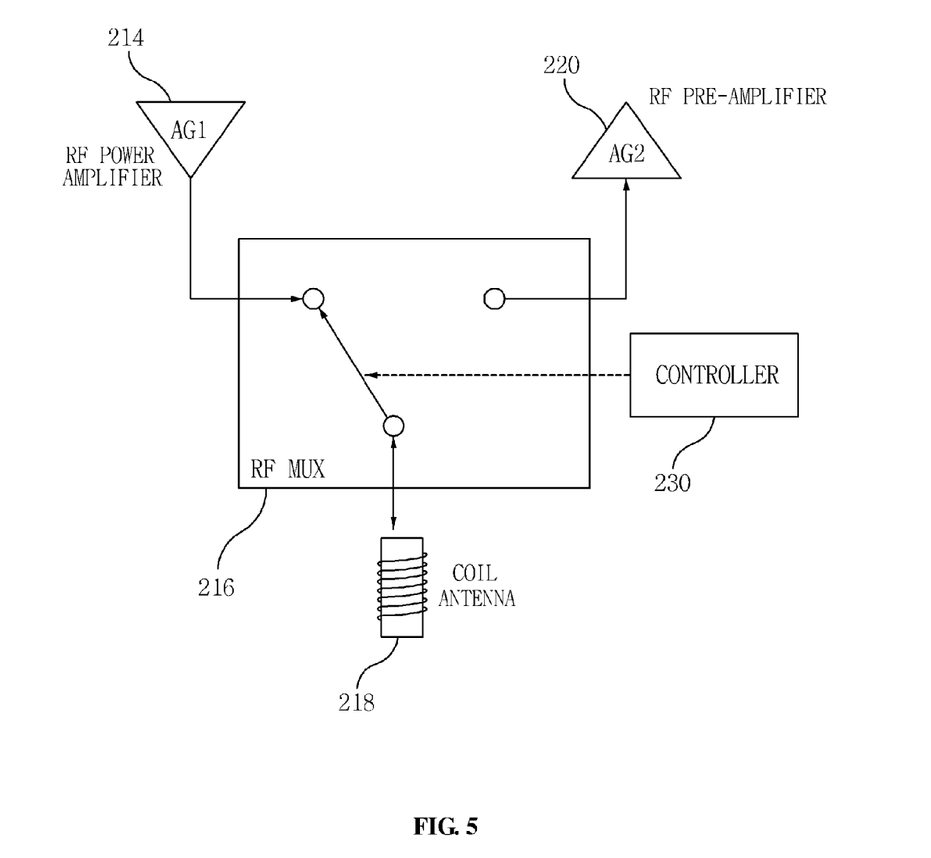
FIG. 5 is a schematic diagram showing a configuration of a connection terminal of a coil antenna of FIG. 3.

FIG. 5 is a schematic diagram showing a configuration of a connection terminal of a coil antenna of FIG. 3.

The analog signal switching device 216 built-in the radio transceiver shown in FIG. 3 is a RF (radio frequency) analog switching circuit, and has a switching function of selecting one of two terminals such as an output terminal of the first analog power amplifier 214 and an input terminal of the second analog pre-amplifier 220 with respect to the one terminal of the coil antenna. The analog signal switching device 216 determines a switching terminal by the controller 230 that is a synchronization circuit. When FM radio signals are transmitted, the terminal of the coil antenna 218 is connected with the output terminal of the first analog power amplifier (AG1) 214, and when FM radio signals are received, the terminal of the coil antenna 218 is connected with the input terminal of the second analog pre-amplifier (AG2) 220.

Figure 6:
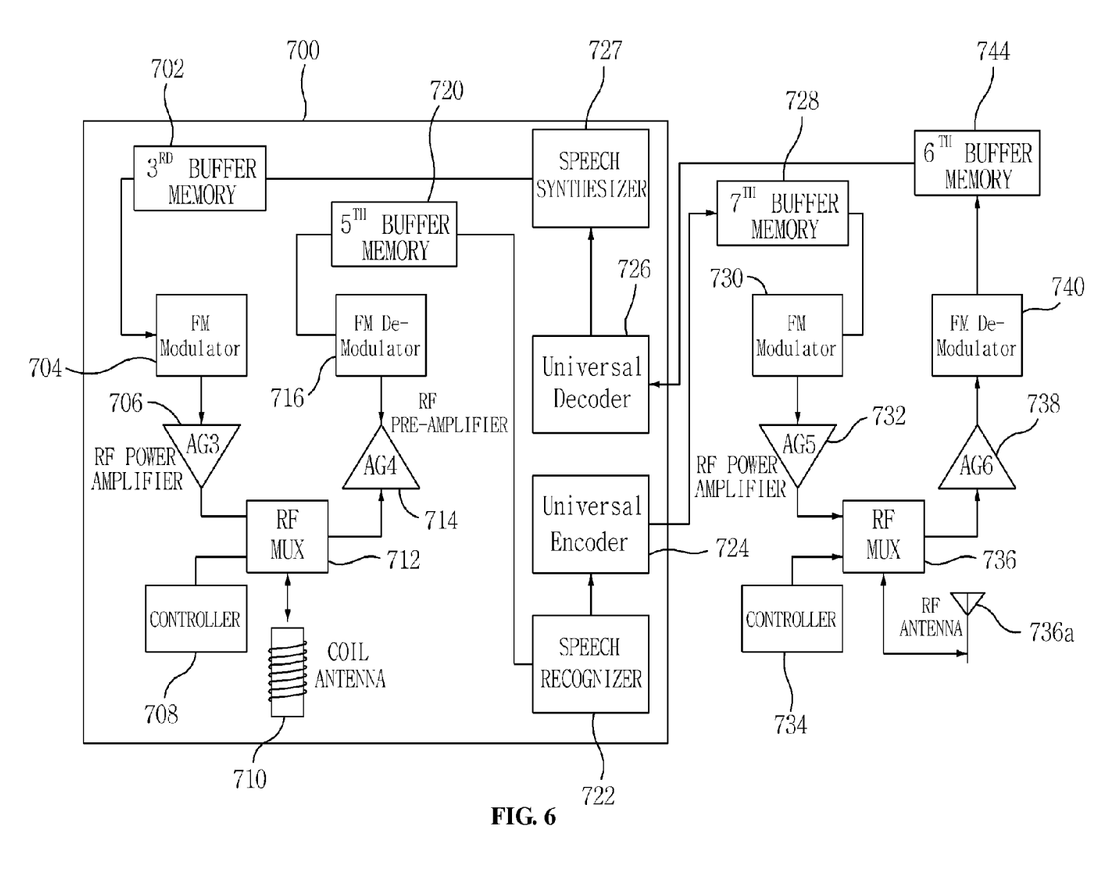
FIG. 6 is a block diagram showing details of a portable communication device of FIG. 2.

FIG. 6 is a block diagram showing details of a portable communication device of FIG. 2.

As can be seen from FIG. 6, the configuration of FIG. 6 is similar to the configuration of the radio signal processor of FIG. 3. The detailed description of the same portions as those described in the radio signal processor 200 will be omitted. However, the portable communication device 700 of FIG. 6 differs from the radio signal processor of FIG. 3 in the fact of including: a radio demodulator 740 that transmits and receives RF analog communication signals for medium-range communications; a voice recognizer 722 that recognizes the voice signal; a voice synthesis unit 727 that generates a speech signal from the voice code; a universal encoder 724 that generates an international standard sound code corresponding to the speech recognized signal; and a universal decoder 726 that decodes the international standard sound code into the voice code, in addition to the coil antenna 710 that transmits and receives the RF analog communication signals for short-range communications.

In operation, the portable communication device 700 operates in two modes including a speech mode and a listening mode. First, in the speech mode, a voice signal of a speaker that is transmitted via the coil antenna 710 in the portable communication device 700 of the radio transceiver 1000 worn by the speaker, is received via the coil antenna 900 built in the portable communication device 700 of the speaker, and then amplified by a fourth RF pre-amplifier 714 through a switching operation of the radio signal switching device (RF MUX) 712, to then be demodulated in a FM demodulator 716 and temporarily stored in a fifth buffer memory 720. The voice signal of the speaker is speech recognized via the voice recognizer 722 and then encoded into an international standard sound code corresponding to the voice recognized by the universal encoder 724, to then be temporarily stored in a seventh buffer memory 728. Thereafter, the encoded signal is modulated in that FM modulator 730 and then power amplified in a fifth RF power amplifier (AG5) 732, to then be selected by a switching operation in the fifth RF analog signal switching device (RF MUX) 732, and to thus be transmitted via a RF antenna 736*a*.

In the listening mode, the international standard sound code transmitted to the portable communication device 700 of the speaker is received via the RF antenna 736*a* of the listener and then amplified in a sixth RF pre-amplifier 738 through a switching operation of the RF antenna 736*a*, to then be demodulated in a FM demodulator 740 and temporarily stored in a sixth buffer memory 744. The international standard sound code of the speaker's voice is decoded into a voice code by the universal decoder 726, to then produce a voice signal sound in the speech synthesizer 727 and then be stored in the third buffer memory 702. Thereafter, the voice signal sound is modulated in the FM modulator 704 and then power amplified in the third RF power amplifier 706, to then be selected by a switching operation in the RF switching device 712, and to thus be transmitted to the radio transceiver worn by the listener via the RF antenna 710.

Since the speech recognizer 722 recognizes the speaker's voice, free from the influence of ambient noise, a speech recognition rate becomes better and a corresponding sound is retrieved from a database (not shown) based on the recognized sound. The universal encoder 724 converts the recognized sound into an internationally standard sound code. This is an encoding process of primarily converting the speaker's voice information into an international standard vocabulary code prior to translating the speaker's voice information into the same language or different languages. In addition, the universal decoder 726 performs a decoding process of entering the international standard vocabulary code and generating a sound code having listener's language corresponding to the international standard vocabulary. Thus, as the vocabulary primarily converted into the international standard vocabulary code is secondarily converted to the voice code of the different languages or the same language, the universal encoder 724 and the universal decoder 727 perform speech translation consequently. The speech synthesizer 722 synthesizes the corresponding voice from the voice code.

As an example, it is assumed that a Korean speaker and an English listener converse with each other. In this case, a Korean voice signal pronounced in Korean is output as Korean vocabulary from a Korean database (not shown) through a voice search application performed in a Korean speech recognizer 722, and then the Korean vocabulary pronounced in Korean by the universal encoder 724 is converted to an international standard vocabulary code corresponding to the Korean vocabulary. Then, the international standard vocabulary code is converted to an English vocabulary voice code by the universal decoder 726, to then produce English voice data by the speech synthesizer 727. Therefore, even in the case that different languages are used, the languages of the conversation parties may be clearly recognized.

So far, the wireless communication device having speech recognition, speech translation, and hearing aid functions according to the embodiment of the present invention, has been described in detail with reference to the accompanying drawings, but such a description is only for illustrative purposes not for limiting the present invention.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

The invention claimed is:

1. A wireless communication device having speech recognition, speech translation, and hearing aid functions, the wireless communication device comprising:
an ITE (In-The-Ear) type radio transceiver including a microphone that receives an external voice, an ITE (In-The-Ear) type radio signal processor that is attached to a person's ear, and that processes radio data received from the microphone, a receiver that converts electrical signals from the radio signal processor into sound pressure, a volume controller that controls the intensity of the sound pressure output from the radio signal processing unit, and a coil antenna for short-range wireless communications; and a portable radio repeater including a portable communication device that relays signals transmitted from the coil antenna of the ITE type radio transceiver, a coil antenna for short-range wireless communications with the ITE type radio transceiver, and a radio frequency (RF) antenna for two-way wireless communications with a portable radio repeater owned by another conversation partner, wherein the radio signal processor includes: an analog-to-digital (A/D) converter that converts an analog signal output from the microphone into a digital signal; a first buffer memory that temporarily stores the signals output from the A/D converter; a second buffer memory that temporarily stores the signals to be output; and a digital-to-analog (D/A) converter that converts a digital signal into an analog signal prior to being output to the receiver, and wherein the radio signal processor includes: a first digital amplifier (DG1) that digital power amplifies the digital signal output from the first buffer memory; a FM (Frequency Modulation) modulator that FM modulate the power amplified signal from the first digital amplifier (DG1); a first analog power amplifier (AG1) that minimizes noise included in the digital signal modulated in the FM modulator to thus wirelessly amplify the noise-minimized digital signal; an analog signal switching device (RF MUX) for switching the signal output from the first analog power amplifier; a coil antenna that propagates the signal output from the analog signal switching device; a controller that controls the switching operation of the switching device between a speech mode and a listening mode; a vector adder that vector sums the signal output from the first buffer memory and the signal fed back from the buffer memory; a digital feedback eliminator that prevent howling that occurs when the sound output from the receiver is fed back to the microphone; a second analog pre-amplifier (AG2) that minimizes communication noise from the RF signal switched by the analog signal switching device; a FM demodulator that demodulates the signal amplified by the second analog pre-amplifier; and a second digital amplifier (DG2) that amplifies the signal demodulated by the FM demodulator.

2. The wireless communication device according to claim 1, wherein the digital feedback eliminator includes: a vector multiplication arithmetic unit; a memory counter unit 206c that stores digital coefficient data by the number of vector w for vector multiplication with the second buffer memory; a third buffer memory that sequentially stores a scalar digital value y that is a scalar value of a scalar y that is a result of a vector multiplication operation of the number w of pieces of the digital data of the second buffer memory and the number w of pieces of the digital data of the memory counter unit; and a coefficient updating unit that adaptively updates the number w of the vectors of the memory counter unit, from the number w of pieces of the digital data of the second buffer memory, the number w of pieces of the digital data of the memory counter unit, and the number w of pieces of the digital data input to the digital feedback eliminator.

3. The wireless communication device according to claim 1, wherein the portable communication device includes: a radio demodulator that transmits and receives RF analog communication signals for medium-range communications; a voice recognizer that recognizes the voice signal; a voice synthesis unit that generates a speech signal from the voice code; a universal encoder that generates an international standard sound code corresponding to the speech recognized signal; and a universal decoder that decodes the international standard sound code into the voice code, in addition to the coil antenna that transmits and receives the RF analog communication signals for short-range communications.

4. The wireless communication device according to claim 3, wherein the universal encoder performs an encoding process of primarily converting the speaker's voice information into an international standard vocabulary code prior to translating the speaker's voice information into the same language or different languages by converting the recognized sound into an internationally standard sound code, and the universal decoder performs a decoding process of entering the international standard vocabulary code and generating a sound code having listener's language corresponding to the international standard vocabulary.

\* \* \* \* \*